(12) United States Patent
Or et al.

(10) Patent No.: US 9,767,121 B2
(45) Date of Patent: Sep. 19, 2017

(54) LOCATION-BASED MOBILE SEARCH

(71) Applicant: c/o vMobo, Inc., Bangalore (IN)

(72) Inventors: Yan Or, San Francisco, CA (US);
Anand Kumar Sankaran, Fremont, CA (US); Madhu Gopinathan, Bangalore (IN); Vinu Sundaresan, Fremont, CA (US)

( * ) Notice: Subject to any disclaimer, the term of this patent is extended or adjusted under 35 U.S.C. 154(b) by 340 days.

(21) Appl. No.: 13/765,634

(22) Filed: Feb. 12, 2013

(65) Prior Publication Data
US 2014/0229468 A1     Aug. 14, 2014

(51) Int. Cl.
*G06F 17/30*     (2006.01)

(52) U.S. Cl.
CPC .............................. *G06F 17/30241* (2013.01)

(58) Field of Classification Search
None
See application file for complete search history.

(56) References Cited

U.S. PATENT DOCUMENTS

| 8,463,772 | B1 * | 6/2013 | Aminzade et al. | 707/723 |
| 8,538,973 | B1 * | 9/2013 | Gonzalez et al. | 707/758 |
| 2005/0289168 | A1 * | 12/2005 | Green et al. | 707/101 |
| 2006/0106778 | A1 * | 5/2006 | Baldwin | 707/3 |
| 2007/0118520 | A1 * | 5/2007 | Bliss et al. | 707/5 |
| 2008/0016055 | A1 * | 1/2008 | Riise et al. | 707/5 |
| 2008/0243821 | A1 * | 10/2008 | Delli Santi et al. | 707/5 |
| 2009/0265340 | A1 * | 10/2009 | Barcklay et al. | 707/5 |
| 2011/0137766 | A1 * | 6/2011 | Rasmussen et al. | 705/30 |
| 2011/0252064 | A1 * | 10/2011 | Murugappan | 707/780 |
| 2012/0278339 | A1 * | 11/2012 | Wang | 707/748 |

* cited by examiner

*Primary Examiner* — Alex Gofman
*Assistant Examiner* — Umar Mian (57) ABSTRACT

A geo-search server receives a query from a user device operated by a user and determines candidate locations that may be associated with the query based on the text of the query, using a geodata index. The geodata index contains information about location names and the geo-locations associated with those names. A relevance score is generated for each candidate location and a target location is selected based on the relevance scores. A query classification is determined based on the query, using a domain index, and query response candidates are selected from a content index based on the target location and the query classification. A relevance score is generated for each of the query response candidates, and a query response is selected based on the relevance scores. The query response is sent to the user device.

17 Claims, 4 Drawing Sheets

LOCATION-BASED MOBILE SEARCH

BACKGROUND

This invention relates generally to mobile search and, in particular, to returning responses to queries based on localizing tokens in the queries.

As the number of cell phones and other mobile devices has increased in the world, the number of search queries originating from mobile users has also similarly increased. Many users utilize mobile devices to search for information using popular search services such as GOOGLE™ and BING™. These services provide search results but often have drawbacks. First, such services may require mobile devices that support an Internet connection, while many mobile users are still using cell phones that only support voice and text messaging. Second, such services may require a user's device to run specific applications, or at the very least a web browser, while many users are still operating mobile hardware that does not support third party applications or web browsers. Third, many search services are oriented to providing search results for touch screen devices or devices with mouse controls, and as such often provide verbose results, such as multiple items in their responses, assuming that the user will be able to navigate through the responses and select from amongst them. In reality, many mobile users operate devices that cannot display large amounts of data, and which lack input means, such as touch screens or mouse controls, to easily select and navigate data. Finally, many search services depend upon location-sensing technologies, such as GPS, to determine the location that is relevant for a user's search query. However, many users operate devices that are not GPS enabled, and which do not have any location-sensing capability.

Thus there is a need for a search service that can provide accurate search results that are relevant to a user's current location, without requiring location-sensing technology or sophisticated input controls in the user's device.

SUMMARY

A query is received by a geo-search server, from a user device operated by a user. The query is a string comprising one or more query tokens. A geodata index is used to determine one or more candidate location tokens from the one or more query tokens. The candidate location tokens correspond to names of real world locations. The geodata index contains information about the names of points of interest and the locations associated with these points of interest. The candidate location tokens are determined by comparing the query tokens with location tokens stored in the geodata index and selecting location tokens that match the query tokens.

A relevance score is generated for each of the candidate location tokens, and a target location for the query is determined based on the relevance scores. The relevance scores may be generated in part based on the position of the candidate location tokens in the query. The target location may be determined by selecting a target location token from among the candidate location tokens based on the relevance scores, and determining a location associated with the target location token in the geodata index.

A query classification is determined for the query based on the query tokens and a domain index. The domain index contains information about the classifications, features, and attributes for a particular domain.

A plurality of query response candidates are selected from a content index based on the query classification and the target location. Each of the query response candidates comprises a document associated with a location. The query response candidates may be selected from the content index by determining a search radius distance based on the query classification and selecting documents in the content index that are associated with locations that are within the search radius distance of the target location.

A relevance score is generated for each of the plurality of query response candidates and a query response is selected from the candidates based on their relevance scores. The selected query response is sent to the user device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
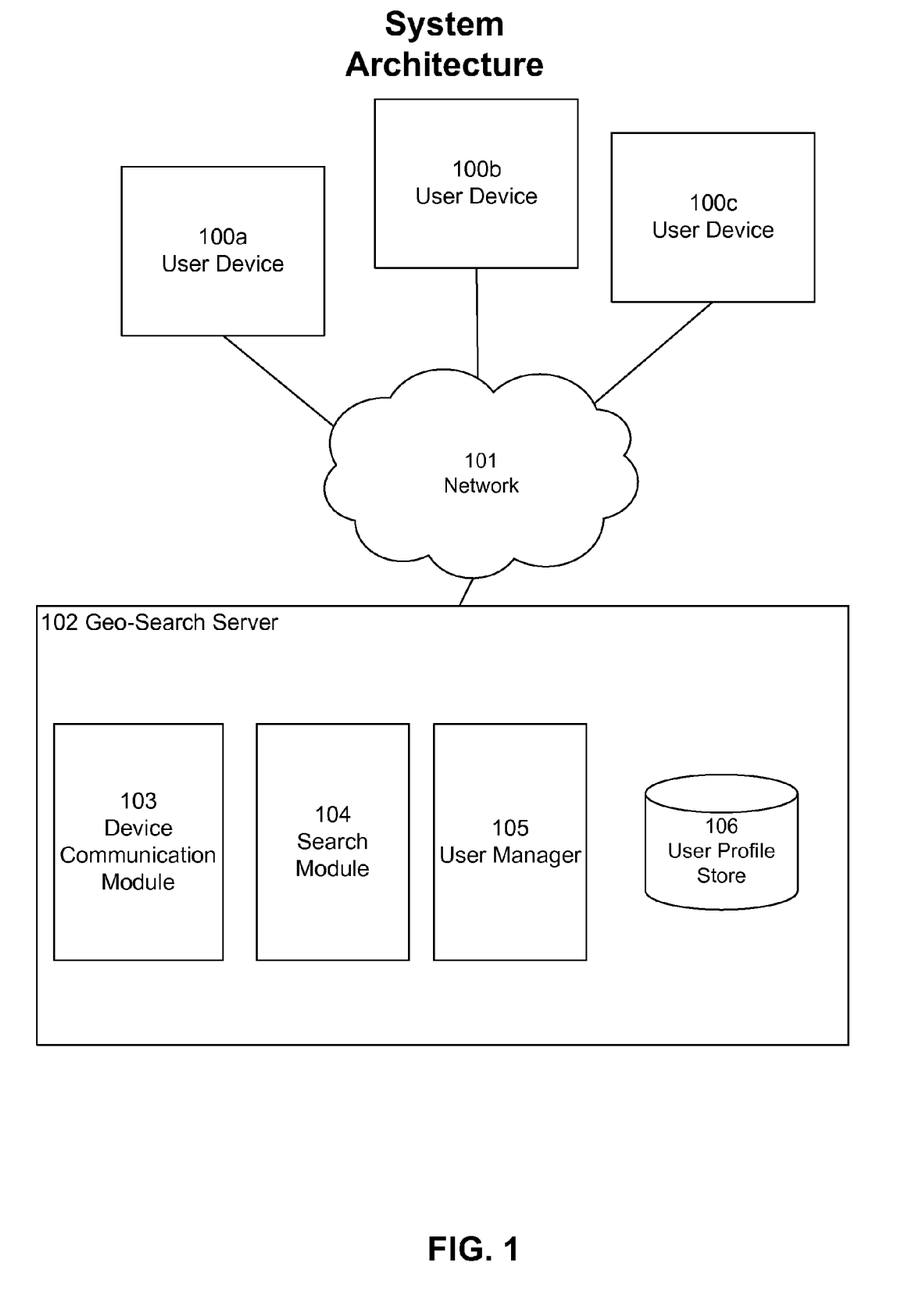
FIG. 1 is a block diagram of a system environment including an embodiment of a geo-search server.

FIG. 1 illustrates the geo-search server 102 operating in a networked environment. Here the geo-search server 102 is connected via a network 101 with three user devices 100, but many more user devices 100 may connect to the geo-search server 102 in practice.

The user devices 100 may be any device with the ability to communicate with the geo-search server 102, such as smart phones, tablets, laptops, personal computers, cell phones, etc. A user operating a user device 100 can send a search query in the form of a query string to the geo-search server 102. The query may be communicated to the geo-search server 102 through any communication means, including through Short Message Service (SMS), through TCP/IP, etc. A user device 100 can also receive a query response from the geo-search server 102 through similar communications means, and can display the query response to the user through a display screen or other output means. The query response will contain information that is relevant to the user's search query.

The network 101 provides a communication infrastructure between the user devices 100 and the geo-search server 102. The network 101 may include cellular networks, the Internet, a Local Area Network (LAN), a Metropolitan Area Network (MAN), a Wide Area Network (WAN), a mobile wired or wireless network, a private network, a virtual private network, etc.

The geo-search server 102 receives queries from the user devices 100 and generates query responses that are sent back to those devices. A query response contains information that is relevant to a user's search query that is determined by the geo-search server 102. The geo-search server 102 includes a device communication module 103, a search module 104, a user manager 105, and a user profile store 106.

The device communication module 103 handles communication between the geo-search server 102 and the user devices 100. The device communication module 103 enables the geo-search server 102 to perform common communications-related operations on messages that are sent and received, such as encryption/decryption, compression/decompression, authentication, etc. Queries sent from user devices 100 are received by the device communication module 103 and sent to the search module 104, and query results produced by the search module 104 are sent by the device communication module 103 to the user devices 100.

The user manager 105 enables users operating the user devices 100 to establish a user account with the geo-search server 102. The user manager 105 may receive information about users operating the user devices 100, from the user devices 100 or from other sources such as directories, retailers, credit agencies, banks, etc. Some user information may be provided by users when they establish a new account with the geo-search server 102, and other information may be collected passively by the user manager 105 over the course of time, as users send search queries to the server (i.e. perform searches).

The user profile store 106 stores the information about users that has been received or collected by the user manager 105. The user profile store 106 may contain information about a user such as age, sex, default location for search, address, product preferences, store preferences, search history, etc.

The search module 104 indexes documents (such as web pages, classifieds, etc.) and maintains a content index. When queries are received from user devices 100, the search module identifies query results that are references to indexed documents that are relevant to the query strings. The query results may be sent back to the user devices 100 via the device communication module 103.

Search Module

Figure 2:
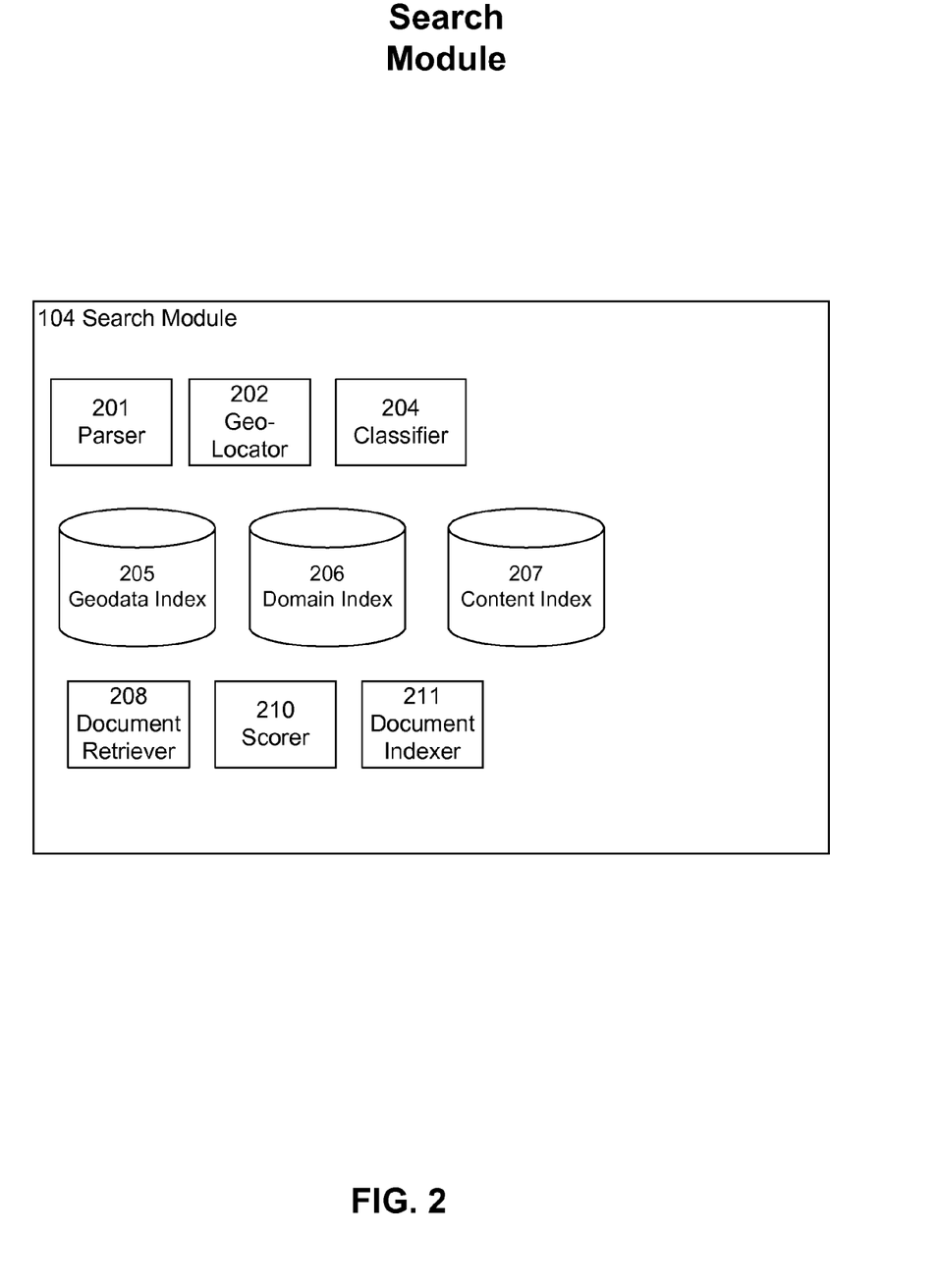
FIG. 2 is a block diagram showing a detailed view of one embodiment of a search module.

FIG. 2 illustrates a detailed view of the components of the search module 104, according to one embodiment. In the illustrated embodiment, the search module 104 comprises a parser 201, a geo-locator 202 a classifier 204, a ranker 209, and a scorer 210, as well as a geodata index 205, domain index 206, and content index 207.

The parser 201 processes queries (query strings) received from the user devices 100 and generates a sequence of tokens. The tokens are words or sequences of words that correspond to concepts that may be relevant to the generation of query responses. For example, the words "New" and "York" are tokens, and the sequence "New York" is also a token. Generating tokens from strings can be done using different techniques. These techniques are well known in the art. For example the system may use a dictionary-based approach for tokenizing the query. In the dictionary-based approach the words in the query are matched against words (tokens) in a premade dictionary to determine the words that are valid tokens. The parser 201 may also be used to generate tokens from content documents that are indexed by the search module 104. The indexing of content documents is described in more detail herein.

The geo-locator 202 takes tokens as input (e.g. the tokens of a query string or document) and determines a real-world location associated with those tokens. The geo-locator 202 utilizes a geodata index 205 to perform this task. The geodata index 205 comprises a list of points of interest. Each point of interest entry in the geodata index 205 comprises location tokens indicating names for that point of interest, geo-location information for the point of interest—such as latitude/longitude coordinates—and granularity for the point of interest. A single point of interest may have multiple location tokens associated with it. For example, the country United States of America may correspond to multiple location tokens, including "America", "United States", "USA", etc. The granularity of a point of interest is an indication of the scale associated with that point of interest. For example, the point of interest for San Francisco may be associated with the granularity "City." Similarly, the point of interest California may be associated with the granularity "State," while the point of interest America may be associated with the granularity "Country." A complete entry for the point of interest San Francisco in the geodata index 205 might include the token "San Francisco," and/or some other synonyms, such as "Frisco" or "San Fran," as well as location coordinates, such as, for example, "−31.425, −62.084", and granularity "City."

To determine a location associated with a query the geo-locator 202 matches tokens outputted by the parser 201 for that query against the location tokens of points of interest stored in the geodata index 205, and selects a best matching point of interest based on 1) the number of tokens that match between the query tokens and the location tokens of a points of interest in the geodata index 205; and 2) the granularity of a points of interest—the more fine grained the granularity of a point of interest, the better a match it is considered (e.g. a point of interest that has a granularity of "City" is better than a point of interest that has a granularity of "Country". The geo-location for the best matching point of interest in the geodata index 205 is used as the location for the query when determining a query response.

The classifier 204 takes the tokens outputted by the parser 201 and using the domain index 206 can determine a classification for a query or document based on those tokens. For example, if a query string is "NY pizza restaurants in San Francisco," the classifier 204 can determine that the query is related to the classifications "restaurants" and "pizza". Similarly the classifier 204 may classify documents that are indexed in the content index 207 by processing the tokens that have been produced from the documents by the parser 201.

The classifier 204 uses a domain index 206 to determine the classification (or topic) to which a query string or document relates to in a particular domain. A domain index 206 is useful in determining the classification of a query for a single domain. Separate domains will have different domain indexes 206. For instance, there may be a single domain index 206 to handle queries related to matrimonial classified advertisements, while there may be a separate domain index 206 to handle queries related to restaurants.

A domain index 206 comprises a list of classifications for a domain, as well as standard and domain-specific features for each of those classifications. The classifications are categories of contents that are relevant for a domain. For example, if the domain is automobile classifieds, the classifications may be car sales classifieds, truck sales classifieds, new car classifieds, etc. The features are characteristics of queries and documents in the domain. The features may be standard, as in not domain-specific, or domain-specific. For example, if the domain is matrimonial classifieds, the features may be characteristics of the person represented in a marriage classified ad, such as age range, sex, religious background, etc. A domain index 206 also contains a list of attributes for each feature that are possible values for that feature. For example, for the age range feature, the attributes may be ages 18-25, ages 26-30, ages 31-35, etc.

The classifier 204 compares tokens in the query string to attributes and features in the domain index 206, to determine a classification for the query. For example, if the query contains tokens such as "Male", "18-25", "Christian", the classifier 204 may use this information to classify the query as a matrimonial classified in the classification "Looking for Men."

A content index 207 is a database containing indexed documents for a domain, which is used to determine query responses. A content index 207 comprises a list of documents, where each document is associated with attributes, a geo-location, document contents, and one or more classifications. For example, for the domain "classified advertisements", the content index 207 may contain a list of classified advertisements with associated data. In this content index 207, one classified ad may have, for instance, an associated classification "car sales classified", with the attributes "Honda", "1997", to indicate that the car advertised for sale in the classified is a Honda made in 1997. This ad may also be associated with a geo-location indicating the address where the car is for sale. The document indexer 211 generates a content index 207 for a domain by processing raw data (such as the text of classified advertisements) and creating a domain specific database for the content in that raw data. An example process for establishing a content index 207 using the document indexer 211 is described in more detail in conjunction with the description of FIG. 3.

The scorer 210 generates relevance scores for locations and documents, which influences how locations and documents are determined for query responses. The relevance scores are a measure of the predicted relevance of a location or document to the query. The process for generating a relevance score may depend on the values of classifications, features, and attributes that have already been determined for a query or document. The scorer 210 is used by the geo-locator 202 and the classifier 204.

The geo-locator 202 uses the scorer 210 to determine relevance scores for location tokens matched in the geodata index 205. For example, a single query may include more than one query token that is matched in the geodata index 205. When multiple location tokens are matched in this way, the geo-locator 202 may set the target location for the query to the location associated with the highest scored, i.e. most relevant, location token. The scorer 210 can computes a relevance score for location tokens based on information about those tokens stored in the geodata index 205. For example, location tokens associated with smaller granularity points of interest may be deemed more relevant than those associated with larger granularity points of interest, or vice versa, depending on the classification of the query. Similarly information about the user from the user profile store 106 may be used to determine the relevance of a location token. For example, location tokens corresponding to points of interest close to a user's set default search location may be scored more highly than other location tokens. Finally, the characteristics of the query string itself may influence the relevance score for a location token. For example, the position in the query string of a location token can influence the relevance score for that location token (e.g. tokens at the end of the query string may be weighted higher because of the way English language queries are typed by users).

The scorer 210 is also used by the document retriever 208 to determine a document that can be sent as a response to a query. The document retriever 208 determines a query response document for a query by using the scorer 210 to determine a relevance score for each of a plurality of query response candidates (candidate documents), and selecting the candidate with the highest relevance score. The relevance score for a document that is a candidate query response can be determined based on factors such as distance between the location associated with the candidate document and a target location associated with the query, user profile information for the user that issued the query, the query's classification, attributes determined for the query, etc. A more detailed description of the process for selecting a query response document is given in conjunction with the description for FIG. 4.

Establishing a Content Index

Figure 3:
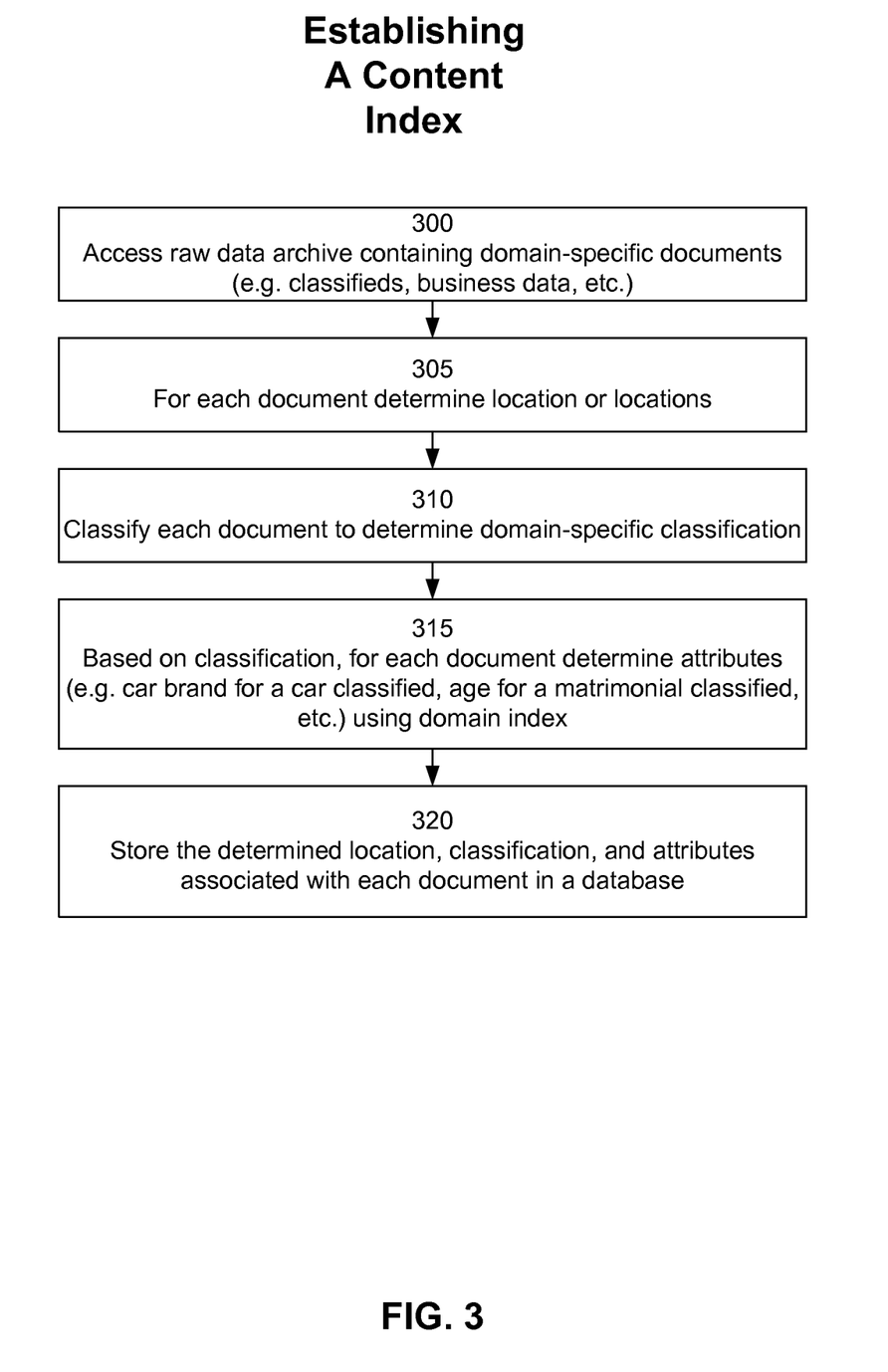
FIG. 3 is a flow chart of a process for establishing a content index in a geo-search server, according to one embodiment.

The document indexer 211 generates a content index 207 for a domain, which can be used by the document retriever 208 to determine query responses for queries in that domain. FIG. 3 illustrates an example process used by the document indexer 211 to generate a content index 207. In the description below the document indexer 211 generates a content index 207 as pre-process, but in practice the document indexer 211 may generate a content index 207 as an ongoing process by continuing to update the context index 207 as new documents are accessed and added to the system.

The document indexer 211 first accesses 300 a data archive containing domain-specific documents such as classified advertisements, restaurant data, business data, etc. This data may be collected by human administrators, by automated systems such as web-crawlers and web-scrapers, by third-party systems, etc. The data may be structured or unstructured.

The document indexer 211 will determine 305 a location or locations for each document using the geo-locator 202. The geo-locator 202 will perform this task using the geodata index 205 and location tokens determined from the document using the parser 201. The document indexer 211 will also classify 310 each document using the classifier 204 as described earlier.

Using the classification for each document, the document indexer 211 will then determine 315 attributes for each document based on the tokens for that document generated by the parser 201 using the domain index 206. For example, if the classification of a document is "car classified", the document indexer 211 will compare tokens in the document to attributes for the classification "car classified" in the domain index 206. By conducting this comparison the document indexer 211 may determine attributes such as "Honda" for the car brand, "1997" for the car year, "red" for the car color, etc.

Finally the document indexer 211 will store 320 the determined location, classification, and attribute data in a database, associated with the document contents. This database is the content index 207 for the domain.

Query Response Generation Process

Figure 4:
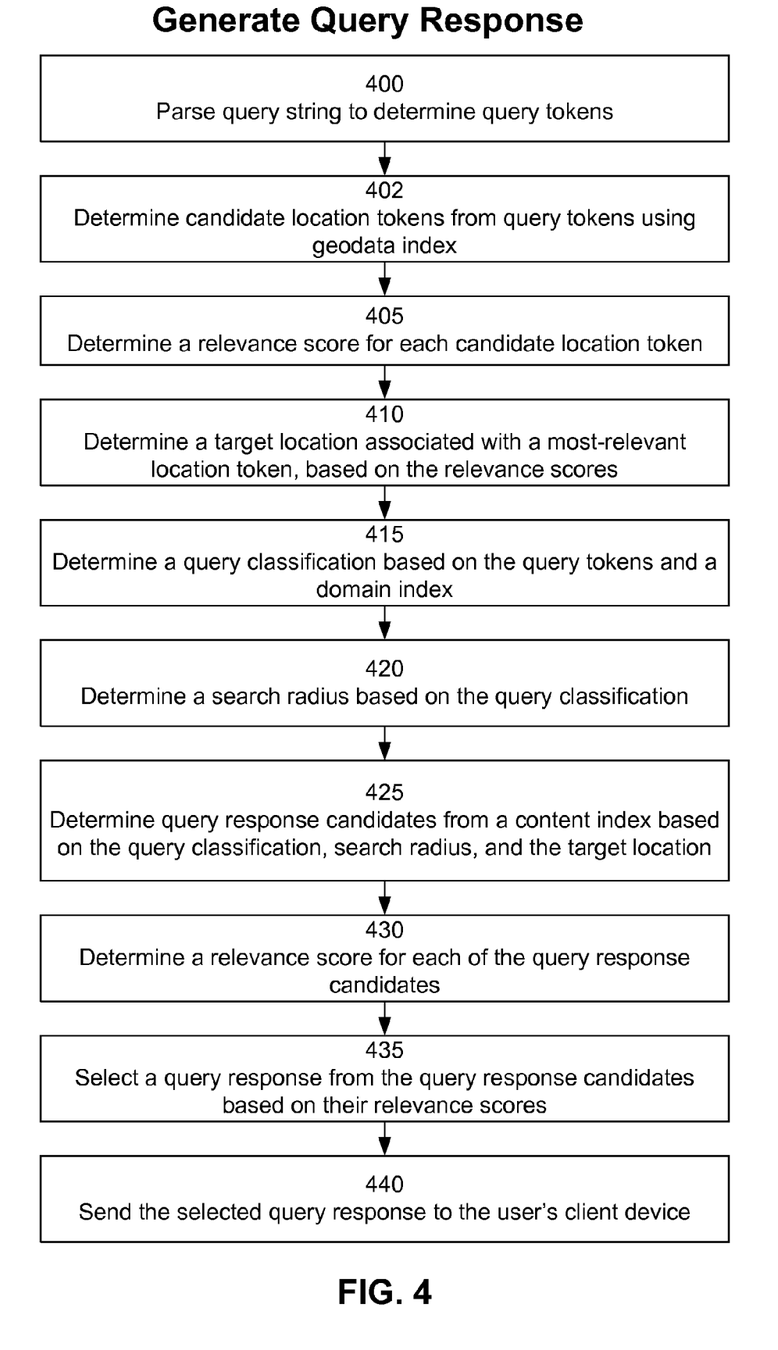
FIG. 4 is a flowchart illustrating the process for generating a query response in a geo-search server, according to one embodiment.

FIG. 4 illustrates a high level flowchart of a process used by the geo-search server 102 to generate a query response for a query received from a user. In this process a query is received from a user device 100 operated by a user and the query is parsed 400 by the parser 201 to determine a sequence of query tokens. Based on these query tokens, candidate location tokens are determined 402 using the geo-locator 202. The candidate location tokens may be determined from the geodata index 205 by matching the query tokens generated by the parser 201 against location tokens in the geodata index 205.

A relevance score is then determined 405 for each candidate location token using the scorer 210. Here factors such as position of the candidate location token in the query string, granularity of the candidate location token (as determined from a corresponding entry in the geodata index 205), default search location of the user, and other factors may be used to generate the relevance scores.

A target location for the query is then determined 410. To determine the target location, the candidate location token with the highest relevance score is selected and then the geo-location associated with the token is determined using the geodata index 205. This geo-location is set as the target location for the query. The target location is the location that is determined to be relevant for the query.

A query classification is also determined 415 by classifying the query tokens using the classifier 204. The query classification is an indication of the nature of the query; e.g. is the query related to a search for an automobile classified, a restaurant, a matrimonial classified, etc. The query classification may be used to determine 420 a search radius. The search radius is made dependent on the query classification so that query responses are relevant for a particular search type. For example, if a query is classified as a search related to "pizza" the search radius may be set to a distance that a user may be expected to drive for pizza (or have pizza delivered).

Query response candidates are then determined 425 from a content index 207. The query response candidates are documents in the content index 207 that are selected by the document retriever 208 based on the query classification, the search radius, the attributes in the query, and the target location. For example, the document retriever 208 may select a list of documents in the content index 207 that match the query classification, and that are associated with a location that is within the search radius distance from the target location. The selected documents from the content index 207 are the query response candidates. Attributes and keywords in the query may also be used as criteria in the selection of query response candidates from the content index 207.

A relevance score for each query response candidate is then determined 430 using the scorer 210. The score for the query response candidates can be based on their distance from the target location, based on information in the user's profile (e.g. by matching user preferences to attributes of the query response candidates), and based on matching keywords and attributes between the query and the document contents associated with the query response candidates.

Finally the document retriever 208 may select 435 a query response from the query response candidates based on their relevance scores. For instance, the query response candidate with the highest relevance score may be selected as the query response. The selected query response can be sent 440 to the user device 100 that issued the query. The query response may be sent directly to the user device 100 by sending the document contents associated with the query response to the user device 100. Or the query response may be sent indirectly as a link or reference to the document contents that can be used by the user operating the user device 100 to retrieve the actual document contents.

Other

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing a response to a query comprising:

receiving the query from a user device operated by a user, the query comprising one or more query tokens;

determining one or more candidate location tokens from the one or more query tokens;

generating a relevance score for each of the one or more candidate location tokens; determining a target location based on the relevance scores, the candidate location tokens, and a geodata index;

determining a query classification using the one or more query tokens and a domain index;

selecting a plurality of query response candidates from a content index based on the query classification and the target location, each query response candidate comprising a document associated with a location, and wherein selecting a plurality of query response candidates from a content index based on the query classification and the target location, further comprises:

determining a search radius distance based on the query classification, wherein the search radius distance is dependent on the query classification such that a query response is relevant for a particular search type, and wherein the search radius distance is preset by a server based on a distance the user expects to travel to the target location;

determining if a document in the content index is associated with a location that is within the search radius distance of the target location; and     selecting the document based at least in part on the determination that it is associated with a location that is within the search radius distance of the target location;

generating a relevance score for each of the plurality of query response candidates; selecting a query response from the plurality of query response candidates based on their relevance scores; and sending the selected query response to the user device.

2. The method of claim 1, wherein determining one or more candidate location tokens from the one or more query tokens, further comprises:

comparing the one or more query tokens with a plurality of location tokens stored in a geodata index; and     selecting location tokens that match the query tokens.

3. The method of claim 1, wherein generating a relevance score for each of the one or more candidate location tokens, further comprises:

generating a relevance score for a candidate location token based at least in part on the position of the candidate location token in the query and a granularity of the candidate location token.

4. The method of claim 1, wherein determining a target location based on the relevance scores, the candidate location tokens, and the geodata index, further comprises:

selecting a target location token from the one or more candidate location tokens based on the relevance scores; and     determining a target location associated with the target location token in the geodata index.

5. The method of claim 1, wherein generating a relevance score for each of the plurality of query response candidates, further comprises:

determining a distance between the location associated with a query response candidate and the target location; and     generating a relevance score based on the distance.

6. The method of claim 1, wherein sending the selected query response to the user device, further comprises sending a reference to a document to the user device.

7. A geo-search server system, executed by at least one computer processor coupled with a computer memory, for providing a response to a query comprising a computer server configured for:

receiving the query from a user device operated by a user, the query comprising one or more query tokens;

determining one or more candidate location tokens from the one or more query tokens;

generating a relevance score for each of the one or more candidate location tokens; determining a target location based on the relevance scores, the candidate location tokens, and a geodata index;

determining a query classification using the one or more query tokens and a domain index;

selecting a plurality of query response candidates from a content index based on the query classification and the target location, each query response candidate comprising a document associated with a location, wherein the computer server for selecting a plurality of query response candidates from a content index based on the query classification and the target location, is further configured for:

determining a search radius distance based on the query classification, wherein the search radius distance is preset based on a distance a user expects to travel to the target location, wherein the search radius distance is dependent on the query classification such that a query response is relevant for a particular search type, and wherein the search radius distance is determined by the computer server;

determining if a document in the content index is associated with a location that is within the search radius distance of the target location; and     selecting the document based at least in part on the determination that it is associated with a location that is within the search radius distance of the target location;

generating a relevance score for each of the plurality of query response candidates;

selecting a query response from the plurality of query response candidates based on their relevance scores; and sending the selected query response to the user device.

8. The system of claim 7, wherein the computer server for determining one or more candidate location tokens from the one or more query tokens, is further configured for:

comparing the one or more query tokens with a plurality of location tokens stored in a geodata index; and     selecting location tokens that match the query tokens.

9. The system of claim 7, wherein the computer server for generating a relevance score for each of the one or more candidate location tokens, is further configured for:

generating a relevance score for a candidate location token based at least in part on the position of the candidate location token in the query and a granularity of the candidate location token.

10. The system of claim 7, wherein the computer server for determining a target location based on the relevance scores, the candidate location tokens, and the geodata index, is further configured for:

selecting a target location token from the one or more candidate location tokens based on the relevance scores; and     determining a target location associated with the target location token in the geodata index.

11. The system of claim 7, wherein the computer server for generating a relevance score for each of the plurality of query response candidates, is further configured for:

determining a distance between the location associated with a query response candidate and the target location; and     generating a relevance score based on the distance.

12. The system of claim 7, wherein the computer server for sending the selected query response to the user device, is further configured for sending a reference to a document to the user device.

13. A non-transitory computer readable medium configured to store instructions executable by a computer processor, the instructions for:

receiving a query from a user device operated by a user, the query comprising one or more query tokens;

determining one or more candidate location tokens from the one or more query tokens;

generating a relevance score for each of the one or more candidate location tokens; determining a target location based on the relevance scores, the candidate location tokens, and a geodata index;

determining a query classification using the one or more query tokens and a domain index;

selecting a plurality of query response candidates from a content index based on the query classification and the target location, each query response candidate comprising a document associated with a location, wherein the instructions for selecting a plurality of query response candidates from a content index based on the query classification and the target location, further comprise instructions for:

determining a search radius distance based on the query classification, wherein the search radius distance is dependent on the query classification such that a query response is relevant for a particular search type, and wherein the search radius distance is preset based on a distance a user expects to travel to the target location;

determining if a document in the content index is associated with a location that is within the search radius distance of the target location; and selecting the document based at least in part on the determination that it is associated with a location that is within the search radius distance of the target location;

generating a relevance score for each of the plurality of query response candidates;

selecting a query response from the plurality of query response candidates based on their relevance scores; and sending the selected query response to the user device.

14. The computer readable medium of claim 13, wherein the instructions for determining one or more candidate location tokens from the one or more query tokens, further comprise instructions for:

comparing the one or more query tokens with a plurality of location tokens stored in a geodata index; and selecting location tokens that match the query tokens.

15. The computer readable medium of claim 13, wherein the instructions for generating a relevance score for each of the one or more candidate location tokens, further comprise instructions for:

generating a relevance score for a candidate location token based at least in part on the position of the candidate location token in the query and a granularity of the candidate location token.

16. The computer readable medium of claim 13, wherein the instructions for determining a target location based on the relevance scores, the candidate location tokens, and the geodata index, further comprise instructions for:

selecting a target location token from the one or more candidate location tokens based on the relevance scores; and determining a target location associated with the target location token in the geodata index.

17. The computer readable medium of claim 13, wherein the instructions for generating a relevance score for each of the plurality of query response candidates, further comprise instructions for:

determining a distance between the location associated with a query response candidate and the target location; and generating a relevance score based on the distance.

* * * * *